United States Patent [19]

Kishimoto

[11] Patent Number: 4,823,631

[45] Date of Patent: Apr. 25, 1989

[54] TRANSMISSION SYNCHRONIZER

[75] Inventor: Minoru Kishimoto, Hiroshima, Japan

[73] Assignee: Mazda Motor Corp., Kanagawa, Japan

[21] Appl. No.: 53,725

[22] Filed: May 26, 1987

[30] Foreign Application Priority Data

May 26, 1986 [JP] Japan .............................. 61-120810

[51] Int. Cl.[4] ............................................. F16H 3/38
[52] U.S. Cl. .................................... 74/339; 192/53 F
[58] Field of Search ................. 192/53 F, 53 E, 53 R; 74/339

[56] References Cited

U.S. PATENT DOCUMENTS

| | | | |
|---|---|---|---|
| 3,272,291 | 9/1966 | Flinn ................................. | 192/53 F |
| 3,414,098 | 12/1968 | Kelbel ............................... | 192/53 F |
| 4,445,602 | 5/1984 | Chana ............................... | 192/53 F |
| 4,623,054 | 11/1986 | Barksdale ......................... | 192/53 E |
| 4,687,081 | 8/1987 | Osterloff et al. ................. | 192/53 F |
| 4,732,247 | 3/1988 | Frost ................................. | 192/53 F |

FOREIGN PATENT DOCUMENTS

| | | | |
|---|---|---|---|
| 0080265 | 10/1982 | European Pat. Off. ........... | 192/53 R |
| 1385860 | 3/1964 | France ............................... | 192/53 F |
| 58-132229 | 9/1983 | Japan . | |
| 2073832 | 3/1981 | United Kingdom ............... | 192/53 F |

*Primary Examiner*—Dwight G. Diehl
*Attorney, Agent, or Firm*—Gerald J. Ferguson, Jr.

[57] ABSTRACT

In a gear type transmission, a pair of gears are provided on input and output shafts always in mesh with each other with one gear being fixedly mounted on the input or output shaft and the other gear being rotatably mounted on the other shaft. A synchronizer for synchronizing the two gears comprises an inner cone which has a tapered outer surface and is rotatably fitted on a hub portion formed integrally and coaxially with the other gear and is in engagement with the clutch hub to permit rotation of the inner cone relative to the clutch hub by a predetermined amount, an outer cone which has a tapered inner surface opposed to the tapered outer surface of the inner cone, and is adapted to be engaged with said hub sleeve by way of splines to be rotated together therewith when the hub sleeve is slid into engagement with the gear spline, a double cone which is disposed between the inner surface of the outer cone and the outer surface of the inner cone and is supported for rotation together with the other gear and for sliding movement in the axial direction of the gear, and a synchronizer key which is movable in response to the sliding motion of the hub sleeve to move the outer cone in the axial direction of the clutch hub to bring the outer cone into frictional engagement with the double cone, thereby bringing the double cone into frictional engagement with the inner cone.

10 Claims, 4 Drawing Sheets

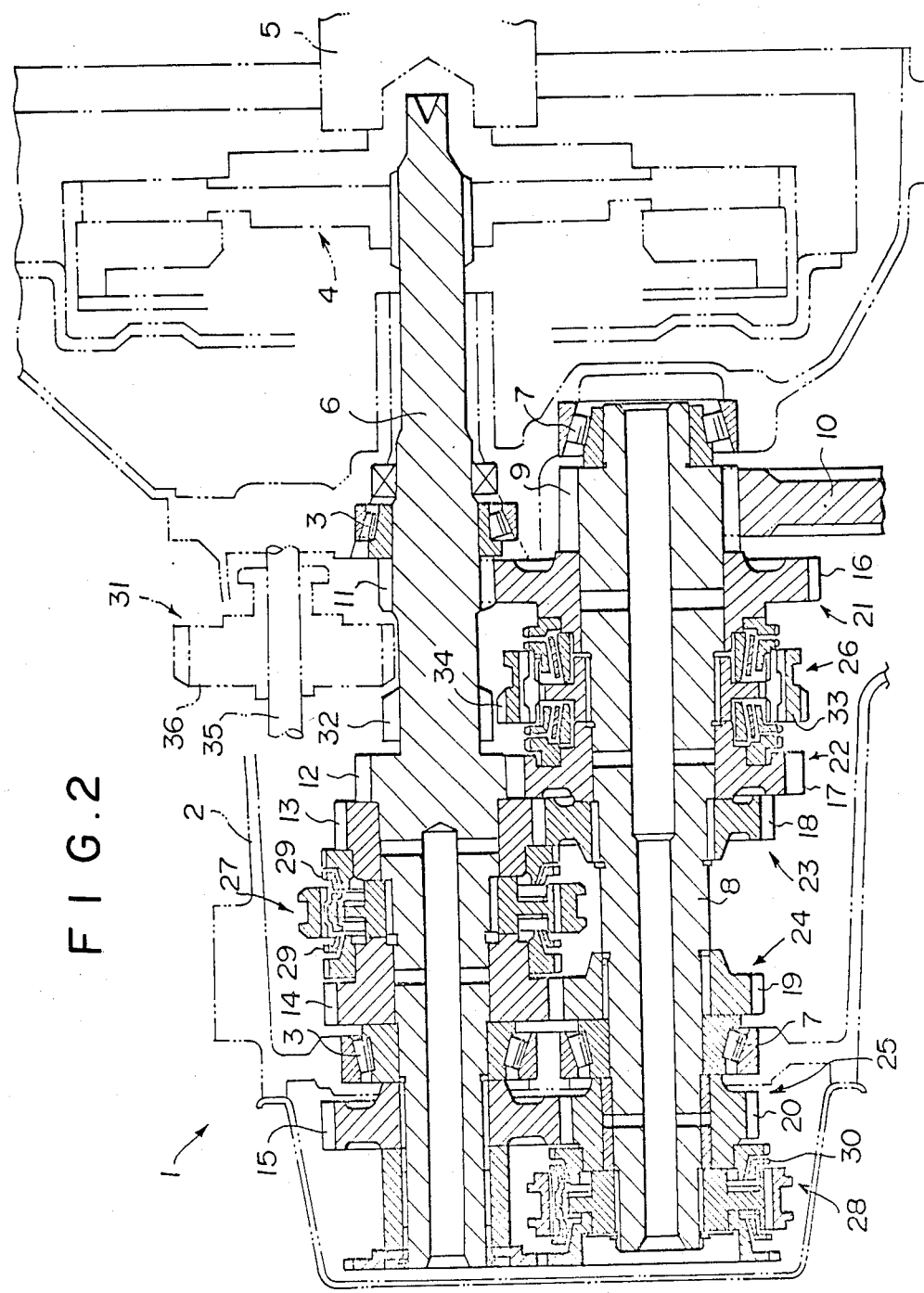
F I G. 2

TRANSMISSION SYNCHRONIZER

BACKGROUND OF THE INVENTION

1. Field of the Invention

This invention relates to a synchronizer for a gear type transmission, and more particularly to a double-cone type synchronizer.

2. Description of the Prior Art

There has been known a gear type transmission for a vehicle in which pairs of gears are provided between an input shaft connected to the engine by way of a clutch and an output shaft connected to the driving wheels and the gear speed is changed by selectively bringing one of the pairs of gears into driving engagement. In the transmission of this type, the gears on one of the shafts are fixedly mounted on the shaft and the gears on the other shaft are mounted so as to be rotatable relative to the shaft with the gears on each shaft always being in mesh with the corresponding gears on the other shaft, and by selectively connecting one of the gears that is rotatable relative to the shaft to a clutch hub fixed to the shaft by way of a hub sleeve, the shafts are operatively connected to each other to transmit the driving force. That is, the rotatably-mounted gears are provided with splines, and the hub sleeve is in engagement with the clutch hub by way of splines to be rotated together with the clutch hub and is axially movable on the outer surface of the clutch hub to be selectively engaged with the splines on one of the rotatably-mounted gears, thereby bringing the rotatably-mounted gear and the clutch hub into driving engagement.

In the gear type transmission having the arrangement described above, a synchronizer is provided to facilitate meshing of the gear spline and the hub sleeve. As the synchronizer, there has been in wide use of a type comprising a cone integrally formed with the rotatably-mounted gear, a synchronizer ring having a tapered surface opposed to the cone and adapted to be engaged with the hub sleeve by way of splines, and a synchronizer key to be moved in response to the sliding motion of the hub sleeve. In the synchronizer, when the hub sleeve is axially slid into engagement with the splines on the rotatably-mounted gear, the synchronizer ring is pushed by the synchronizer key to be frictionally engaged with the cone, thereby bringing the gear spline and the hub sleeve into synchronization prior to meshing thereof. See Japanese Unexamined Utility Model Publication No. 58(1983)-132229, for instance. In a gear type transmission for a truck, especially in the first and second speed gears, the synchronizer ring or the cone is rotated with a large torque and accordingly it is preferred that the clutch capacity or the synchronization capacity between the synchronizer ring and the cone be as large as possible.

Accordingly, there has been proposed a double-cone type synchronizer in which frictional engagements are produced at a pair of parts in order to increase the synchronization capacity. As shown in FIG. 3, the double cone type synchronizer comprises an inner cone 53 having a tapered outer surface and fitted on a shaft 51 (the input shaft or the output shaft), on which a gear 50 is rotatably mounted, to be rotated together with a clutch hub 52, an outer cone 55 having a tapered inner surface opposed to the outer surface of the inner cone 53 and mounted coaxially with a hub sleeve 54, a double cone 57 provided between the inner surface of the outer cone 55 and the inner surface of the inner cone 53 to be rotatable together with the gear 50 and to be axially movable, and a synchronizer key 58 adapted to be moved in the direction of the axis of the hub in response to sliding of the hub sleeve 54 to push the outer cone 55 in the same direction to bring the outer cone 55 into frictional engagement with the double cone 57 and bring the double cone 57 into frictional engagement with the inner cone 53. In the double cone type synchronizer, the inner cone 53 and the outer cone 55 engaged with the hub sleeve 54 by way of splines are brought into frictional engagement with the double cone 57 on opposite sides of the double cone 57 before the hub sleeve 54 is brought into engagement with the gear spline 56, whereby the gear spline 56 and the hub sleeve 54 are brought into synchronization. That is, the synchronization capacity is increased by connecting the gear spline 56 and the hub sleeve 54 rotating at different speeds by way of a pair of frictional engagements.

In the double cone type synchronizer, the inner cone 53 must be rotatable relative to the clutch hub 52 in order to accommodate the difference in the angular position between them at the beginning of the frictional engagement thereof. Accordingly, conventionally, as shown in FIG. 4 the splines 51a on the shaft 51 are formed at relatively large intervals and the spline grooves 53a on the inner cone 53 to be engaged with the splines 51a are formed to have a width larger than the width of the spline 51a. However, this arrangement is disadvantageous in that the number of the splines 51a on the shaft 51 is inherently reduced and the strength of the connection between the shaft 51 and the clutch hub 52 is weakened. Further, when the transmission is required to be compact, the splines on the clutch hub 52 must be shortened in order to mount the inner cone on the shaft 51, which also weakens the strength of the connection.

SUMMARY OF THE INVENTION

In view of the foregoing observations and description, the primary object of the present invention is to provide a double-cone type synchronizer in which the clutch hub and the shaft can be connected with a sufficient strength.

The synchronizer in accordance with the present invention is of a double-cone type and is characterized in that the inner cone is rotatably fitted on a hub portion formed integrally and coaxially with the rotatably-mounted gear on the shaft and the inner cone is in engagement with the clutch hub to permit rotation of the inner cone relative to the clutch by a predetermined amount.

BRIEF DESCRIPTION OF THE DRAWINGS

FIG. 2 is a cross-sectional view showing a gear type transmission employing the synchronizer showing in FIG. 1.

DESCRIPTION OF THE PREFERRED EMBODIMENT

Figure 1:
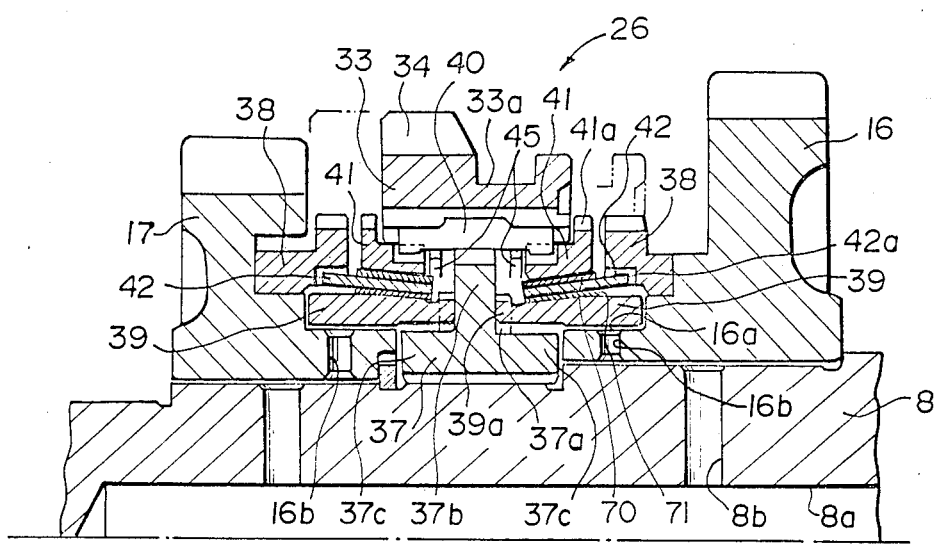
FIG. 1 is a cross-sectional view showing a synchronizer in accordance with an embodiment of the present invention.
Figure 3:
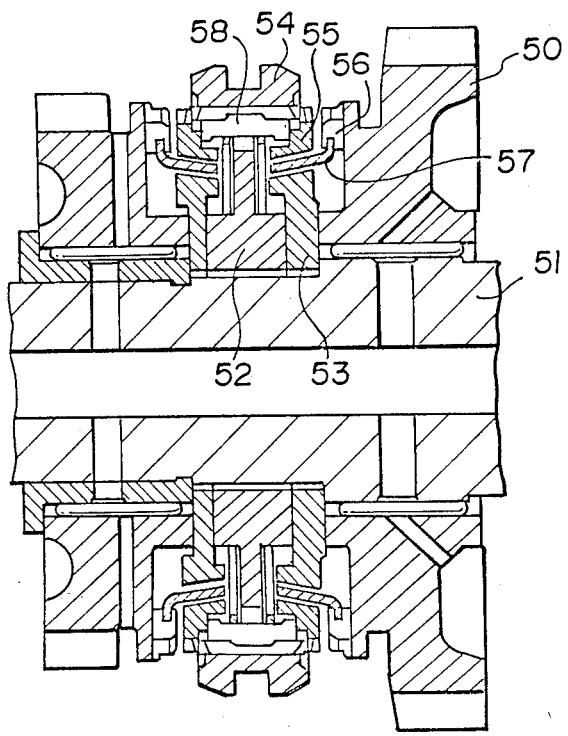
FIG. 3 is a cross-sectional view for illustrating a conventional double-cone type synchronizer.

In FIGS. 1 and 2, a gear type transmission 1 comprises an input shaft 6 supported for rotation on a transmission case 2 by way of bearings 3 and connected to an engine output shaft 5 by way of a clutch 4, and an output shaft 8 supported for rotation in parallel to the input shaft 6 on the transmission case 2 by way of bearings 7. A gear 11 integrally formed with the input shaft 6 or connected to the input shaft 6 by way of splines to rotate together with the input shaft 6 and a gear 16 rotatably mounted on the output shaft 8 to be rotatable relative to the output shaft 8 are always in engagement with each other and form first speed gears 21. A gear 12 integrally formed with the input shaft 6 or connected to the input shaft 6 by way of splines to rotate together with the input shaft 6 and a gear 17 rotatably mounted on the output shaft 8 to be rotatable relative to the output shaft 8 are always in engagement with each other and form second speed gears 22. A gear 18 integrally formed with the output shaft 8 or connected to the output shaft 8 by way of splines to rotate together with the output shaft 8 and a gear 13 rotatably mounted on the input shaft 6 to be rotatable relative to the input shaft 6 are always in engagement with each other and forms third speed gears 23. A gear 19 integrally formed with the output shaft 8 or connected to the output shaft 8 by way of splines to rotate together with the output shaft 8 and a gear 14 rotatably mounted on the input shaft 6 to be rotatable relative to the input shaft 6 are always in engagement with each other and forms fourth speed gears 24. A gear 15 integrally formed with the input shaft 6 or connected to the input shaft 6 by way of splines to rotate together with the input shaft 6 and a gear 20 rotatably mounted on the output shaft 8 to be rotatable relative to the output shaft 8 are always in engagement with each other and form fifth speed gears 25. Between the gears 16 and 17 rotatably mounted on the output shaft 8 is provided a first-and-second speed synchronizer 26 for selectively connecting one of the gears 16 and 17 to the output shaft 8 in response to operation of the shift lever (not shown). Between the gears 13 and 14 rotatably mounted on the input shaft 6 is provided a third-and-fourth speed synchronizer 27 for selectively connecting one of the gears 13 and 14 to the input shaft 6 in response to operation of the shift lever. Further on the rear side (the left side in FIG. 2) of the gear 20 rotatably mounted on the output shaft 8 is provided a fifth speed synchronizer 28 for selectively connecting the gear 20 to the output shaft 8 in response to operation of the shift lever.

Between the first speed gears 21 and the second speed gears 22 provided between the input shaft 6 and the output shaft 8 is provided a reverse gears 31. The reverse gears 31 comprises a reverse gear 32 integrally formed with the input shaft 6, a reverse gear 34 formed on the outer surface of a hub sleeve 33 for the first-and-second speed synchronizer 26, and a reverse idler gear 36 supported for rotational and sliding movement on a reverse idler shaft 35 and adapted to be slid leftward into engagement with the reverse gears 32 and 34 when reverse gear is selected. An output gear 9 formed on the rear end of the output shaft 8 is in mesh with, for instance, an input gear 10 of a differential (not shown) to transmit rotation of the output shaft 8 to the driving wheel.

The third-and-fourth speed synchronizer 27 and the fifth speed synchronizer 28 are of a known construction in which common synchronizer rings 29 and 30 are used. On the other hand, the first-and-second speed synchronizer 26 is formed in accordance with an embodiment of the present invention and will be described in detail with reference to FIG. 1, hereinbelow.

Since the first speed side mechanism for connecting the gear 16 to the output shaft 8 and the second speed side mechanism for connecting the gear 17 to the output shaft 8 of the first-and-second speed synchronizer 26 are symmetrical to each other, the corresponding elements are given the same reference numerals, and only the former mechanism will be described, hereinbelow. A clutch hub 37 is engaged with the output shaft 8 by way of splines. A gear spline 38 is formed integrally with the gear 16 rotatably mounted on the output shaft 8. A hub portion 16a is formed on the gear 16 at the end portion thereof on the side of the clutch hub 37. An inner cone 39 is rotatably fitted on the hub portion 16a. The hub portion 16a is provided with an oil passage hole 16b for communicating the outer surface and the inner surface of the hub portion 16a with each other. The oil passage hole 16b is connected to an oil passage 8a extending through the output shaft 8 by way of a transverse oil passage 8b formed in the output shaft 8 and the space between the hub portion 16a and the outer surface of the output shaft 8 to supply lubricating oil between the outer surface of the hub portion 16a and the inner surface of the inner cone 39. The inner cone 39 is substantially annular and is coaxial with the gear 16. The outer surface of the inner cone 39 is tapered toward the clutch hub 37. A plurality of keys 39a are formed on the front end portion of the inner cone 39 spaced from each other and are inserted between protrusions 37a on the clutch hub 37. The clutch hub 37 comprises a disk-like portion 37b and a pair of boss portions 37c extending in opposite directions on opposite sides of the disk-like portion 37b, and the protrusions 37a are formed to extend over a part of the disk-like portion 37b and a part of the boss portions 37c. The spaces between the protrusions 37a are larger than the widths of the keys 39a so that the inner cone 39 can be rotated relative to the clutch hub 37 by a predetermined amount corresponding to the difference between the space between the protrusions 37a and the width of the key 39a.

A hub sleeve 33 is engaged with the outer surface of the clutch hub 37 by way of splines to be rotated together with the clutch hub 37 and to be slidable relative to the clutch hub 37 in the axial direction of the clutch hub 37 (longitudinal direction of the output shaft 8). A plurality of synchronizer keys 40 are held by the clutch hub 37 by way of springs 45. The synchronizer keys 40 are engaged with the hub sleeve 33 to be slid together with the hub sleeve 33. Between the gear spline 38 and the clutch hub 37 is provided an outer cone 41. The outer cone 41 has a tapered inner surface conforming to the tapered outer surface of the inner cone 39 and splines 41a formed on the outer surface thereof. Further, the outer cone 41 is provided with an abutment surface against which the synchronizer keys 40 abut to push the outer cone 41 when the keys 40 are slid together with the hub sleeve 33. Between the inner surface of the outer cone 41 and the outer surface of the inner cone 39 is disposed a double cone 42 having a plurality of keys 42a formed on one end thereof and engaged with the gear spline 38. Thus, the double cone 42 is rotated together with the gear spline 38 and is movable in the axial direction of the gear 16 to some extent. An outer lining 70 and an inner lining 71 are respectively bonded on the outer and inner surfaces of the double cone 42.

When a shift fork (not shown) in engagement with an annular groove 33a formed on the outer peripheral surface of the hub sleeve 33 is operated to slide the hub sleeve 33 toward the gear 16, the hub sleeve 33 is engaged with the outer cone 41 by way of the splines. At the same time, the synchronizer key 40 pushes the outer cone 41 toward the gear 16 and accordingly, the inner surface of the outer cone 41 is pressed against the double cone 42 into frictional engagement with the double cone 42 by way of the outer lining 70. Further, the outer cone 42 is also pushed toward the gear 16 and is pressed against the outer surface of the inner cone 39 into frictional engagement therewith by way of the inner liner 71. Since the double cone 42 is rotated together with the gear spline 38, the gear spline 38 and the hub sleeve 33 are brought into synchronization, that is, into rotation at the same speed, when the frictional engagements are made. Accordingly, when the hub sleeve 33 is further slid toward the gear 16, the hub sleeve 33 is smoothly engaged with the gear spline 38 to drivingly connect the gear 16 and the output shaft 8. The gear 17 is drivingly connected to the output shaft 8 in a similar manner by sliding the hub sleeve 33 toward the gear 17.

In this synchronizer, the clutch hub side and the gear side make frictional engagements at two places as described above, and accordingly, the clutch hub side and the gear side can be positively brought into frictional engagement even if the gear 16 is rotated with a large torque. That is, the synchronization capacity of the synchronizer is sufficiently increased.

Figure 4:
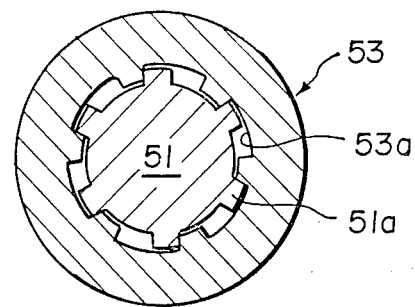
FIG. 4 is a cross-sectional view of a part of the conventional synchronizer.

When the inner cone 39, the double cone 42 and the outer cone 41 are brought into frictional engagements, the inner cone 39 must be rotatable relative to the outer cone 41. This rotation is permitted since the inner cone 39 is rotatable relative to the clutch hub 37 as described above. Further, since the inner cone 39 is rotatably mounted on the hub portion 16a integrally formed with the gear 16, means for holding the inner cone 39 need not be provided on the output shaft. Accordingly, the clutch hub 37 can be connected to the output shaft 8 with a sufficient strength by normal means such as the use of splines. Further, the clutch hub 37 can be arranged to fit on the output shaft 8 over a sufficient length, thereby further increasing the strength of the connection between the clutch hub 37 and the output shaft 8. Further, since the inner cone 39 is rotatably mounted on the hub portion 16a, the inner cone 39 can be more smoothly rotated than when held on the output shaft 8 by way of splines as shown in FIG. 4.

Figure 5:
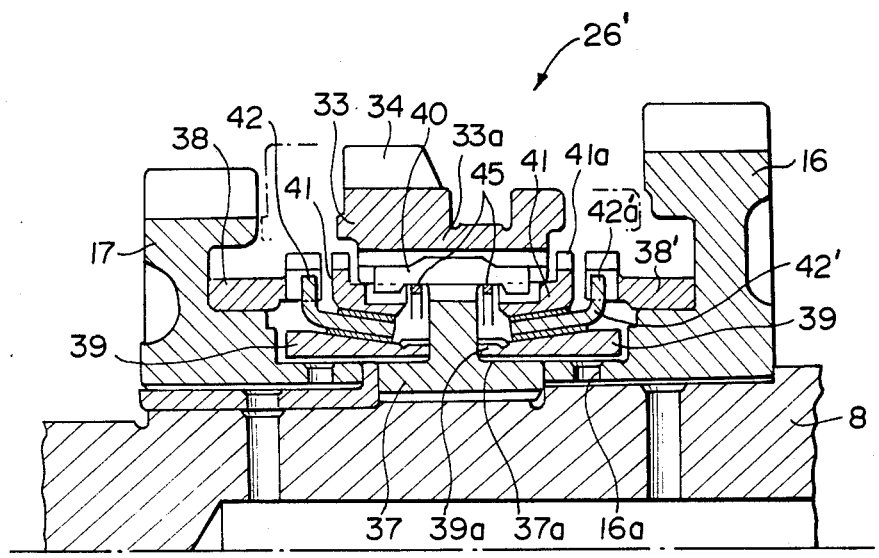
FIG. 5 is a view similar to FIG. 1 but for illustrating a modification of the synchronizer of FIG. 1.

FIG. 5 shows a modification of the synchronizer shown in FIG. 1. In the synchronizer 26' shown in FIG. 5, the gear spline side end of the double cone 42' is bent radially outwardly and a plurality of keys 42a' are formed on the bent end. With this arrangement, the connecting rigidity between the gear spline 38' and the double cone 42' is enhanced.

In the synchronizers 26 and 26' shown in FIGS. 1 and 5, the inner cone 39 is supported on the hub portion 16a of the gear 16 and is engaged with the clutch hub 37 at different portions. This arrangement facilitates processing of the inner peripheral surface of the inner cone 39 at which the inner cone 39 is supported on the hub portion 16a, the keys 39a of the inner cone 39 at which the inner cone 39 is engaged with the clutch hub 37, and the protrusions 37a of the clutch hub 37 to be engaged with the keys 39a of the inner cone 39. That is, the inner cone 39 must be positioned with a high accuracy with respect to the output shaft 8. And accordingly, when the keys 39a are formed on the inner peripheral surface of the inner cone 39 at which the inner cone 39 is supported and positioned with respect to the output shaft 8, the keys 39a must be formed with a high accuracy.

Figure 6:
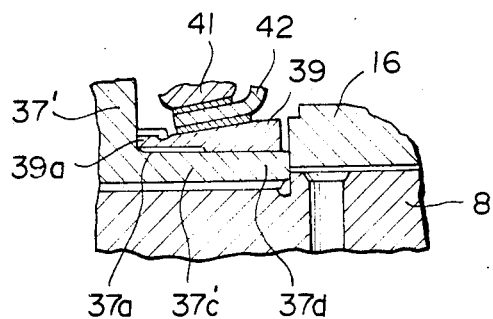
FIG. 6 is a fragmentary cross-sectional view for illustrating another modification of the synchronizer of FIG. 1.

Though in the synchronizers 26 and 26' shown in FIGS. 1 and 5, the inner cone 39 is supported on the hub portion 16a of the gear 16, the inner cone 39 may be instead supported on an extension 37d of the boss portion 37c' of the clutch hub 37' as shown in FIG. 6.

I claim:

1. A synchronizer for a gear type transmission in which a plurality of pairs of gears are provided on input and output shafts, the two gears of each pair being always in mesh with each other with one gear of each pair being fixedly connected to one of the input and output shafts and the other gear of each pair being rotatably connected to the other shaft to be rotatable relative thereto, and the other gear of each couple is adapted to be drivingly connected to said other shaft by way of a clutch hub with a radially extending disc portion and an axially extending boss portion fixedly provided on said the other shaft, a gear spline provided on said the other gear of each couple integrally therewith, and a hub sleeve which is engaged with the clutch hub to be rotated together therewith and is slidable in the axial direction of the clutch hub to be engaged with the gear spline to transmit rotation of the clutch hub to the gear spline, said synchronizer being for synchronizing the two gears of at least one of the pairs and comprising an inner cone which has a tapered outer surface and is rotatably mounted on a hub portion formed integrally and coaxially with said the other gear of the couple and is in engagement with said clutch hub to permit rotation of the inner cone relative to the clutch hub by a predetermined amount, an outer cone which has a tapered inner surface opposed to the tapered outer surface of the inner cone, and is adapted to be engaged with said hub sleeve by way of splines to be rotated together therewith when the hub sleeve is slid into engagement with the gear spline, a double cone which is disposed between the inner surface of the outer cone and the outer surface of the inner cone and is supported for rotation together with said the other gear of the couple and for sliding movement in the axial direction of said the other gear, and a synchronizer key which is movable in response to the sliding movement of the hub sleeve to move the outer cone in the axial direction of the clutch hub to bring the outer cone into frictional engagement with the double cone, thereby bringing the double cone into frictional engagement with the inner cone;

a first friction surface existing between the inner cone and the double cone, and a second friction surface existing between the double cone and the outer cone;

a substantial portion of the inner peripheral surface of the inner cone laps over an outer cylindrical surface of said boss portion of the clutch hub in the direction of the output shaft, a front portion of the inner cone having a plurality of keys therein which are disposed between a plurality of protrusions on the clutch hub; each of the plurality of protrusions being spaced apart by a predetermined spacing; each of the plurality of keys having a width in the peripheral direction which is smaller than said predetermined spacing; the inner cone and the clutch hub being rotatable relative to each other through a predetermined angle in the peripheral direction;

whereby, during engagement of the hub sleeve with the gear spline, the synchronizer key pushes the outer cone into frictional engagement with the double cone which in turn comes into frictional engagement with the inner cone, thereby synchronizing the gear spline and the hub sleeve.

2. A synchronizer as defined in claim 1 in which said hub portion of said the other gear is provided with an oil passage communicating the inner and outer peripheral surfaces thereof to lubricate the inner surface of the inner cone and the outer surface of the hub portion.

3. A synchronizer as defined in claim 1 in which the end portion of the double cone facing said the other gear is bent radially outwardly.

4. A synchronizer as claimed in claim 1, wherein the friction surface formed between the inner cone and the double cone laps over the boss portion of the clutch hub in the direction of the output shaft.

5. A synchronizer as defined in claim 4 in which said clutch hub comprises a disk-like portion and a boss portion axially extending from the disk-like portion and said protrusion is formed to extend over a part of the disk-like portion and a part of the boss portion.

6. A synchronizer as claimed in claim 1, wherein the gear spline side end of the double cone is bent radially outwardly and a plurality of keys are formed on the bent end, to enhance the connecting rigidity between the gear spline and the double cone.

7. A synchronizer as defined in claim 1, in which said clutch hub comprises a disk-like portion and a boss portion axially extending from the disk-like portion and said protrusion is formed to extend over a part of the disk-like portion and a part of the boss portion.

8. A synchronizer as defined in claim 1, in which double cone is not in mesh with the hub sleeve.

9. A synchronizer for a gear type transmission in which a plurality of pairs of gears are provided on input and output shafts, the two gears of each pair being always in mesh with each other with one gear of each pair being fixedly connected to one of the input and output shafts and the other gear of each pair being rotatably connected to the other shaft to be rotatable relative thereto, and said other gear of each pair is adapted to be drivingly connected to said other shaft by way of a clutch hub with a radially extending disc portion and an axially extending boss portion fixedly provided on said the other shaft, a gear spline provided on said the other gear of each couple integrally therewith, and a hub sleeve which is engaged with the clutch hub to be rotated together therewith and is slidable in the axial direction of the clutch hub to be engaged with the gear spline to transmit rotation of the clutch hub to the gear spline, said synchronizer being for synchronizing the two gears of at least one of the pairs and comprising an inner cone which has a tapered outer surface and is supported for rotation relative to said other gear and is in engagement with said clutch hub to permit rotation of the inner cone relative to the clutch hub by a predetermined amount, the portion at which the inner cone is supported for rotation being different from the portion at which the inner cone is engaged with the clutch hub, an outer cone which has a tapered inner surface opposed to the tapered outer surface of the inner cone, and is adapted to be engaged with said hub sleeve by way of splines to be rotated together therewith when the hub sleeve is slid into engagement with the gear spline, a double cone which is disposed between the inner surface of the outer cone and the outer surface of the inner cone and is supported for rotation together with said other gear of the couple and for sliding movement in the axial direction of said other gear, and a synchronizer key which is movable in response to the sliding movement of the hub sleeve to move the outer cone in the axial direction of the clutch hub to bring the outer cone into frictional engagement with the double cone, thereby bringing the double cone into frictional engagement with the inner cone;

a first friction surface existing between the inner cone and the double cone, and a second friction surface existing between the double cone and the outer cone;

a front portion of the inner cone having a plurality of keys therein which are disposed between a plurality of protrusions on the clutch hub wherein each of said plurality of protrusions is formed to extend over a part of said disc portion and a part of said boss portion of said clutch hub; each of the plurality of protrusions being spaced apart by a predetermined spacing; each of the plurality of keys having a width in the peripheral direction which is smaller than said predetermined spacing;

the inner cone and the clutch hub being rotatable relative to each other through a predetermined angle in the peripheral direction;

whereby, during engagement of the hub sleeve with the gear spline, the synchronizer key pushes the outer cone into frictional engagement with the double cone which in turn comes into frictional engagement with the inner cone, thereby synchronizing the gear spline and the hub sleeve.

10. A synchronizer for a gear type transmission in which a plurality of pairs of gears are provided on input and output shafts, the two gears of each pair being always in mesh with each other with one gear of each pair being fixedly connected to one of the input and output shafts and the other gear of each pair being rotatably connected to the other shaft to be rotatable relative thereto, and the other gear of each couple is adapted to be drivingly connected to said other shaft by way of a clutch hub with a radially extending disc portion and an axially extending boss portion fixedly provided on said the other shaft, a gear spline provided on said the other gear of each couple integrally therewith, and a hub sleeve which is engaged with the clutch hub to be rotated together therewith and is slidable in the axial direction of the clutch hub to be engaged with the gear spline to transmit rotation of the clutch hub to the gear spline, said synchronizer being for synchronizing the two gears of at least one of the pairs and comprising an inner cone which has a tapered outer surface and is rotatably mounted on a hub portion formed integrally and coaxially with said the other gear of the couple and is in engagement with said clutch hub to permit rotation of the inner cone relative to the clutch hub by a predetermined amount;

an outer cone which has a tapered inner surface opposed to the tapered outer surface of the inner cone, and is adapted to be engaged with said hub sleeve by way of splines to be rotated together therewith when the hub sleeve is slid into engagement with the gear spline, a double cone which is disposed between the inner surface of the outer cone and the outer surface of the inner cone and is supported for rotation together with said the other gear of the couple and for sliding movement in the axial direction of said the other gear, and a synchronizer key which is movable in response to the sliding movement of the hub sleeve to move the outer cone in the axial direction of the clutch hub to bring the outer cone into frictional engagement with the double cone, thereby bringing the double cone into frictional engagement with the inner cone;

a first friction surface existing between the inner cone and the double cone, and a second friction surface existing between the double cone and the outer cone;

the first friction surface which is formed between the inner cone and the double cone laps over said boss portion of the clutch hub in the direction of the output shaft;

the inner peripheral surface of the inner cone laps over said boss portion of the clutch hub in the direction of the output shaft;

the double cone is not in mesh with the hub sleeve;

a front portion of the inner cone having a plurality of keys therein which are disposed between a plurality of protrusions on the clutch hub; each of the plurality of protrusions being spaced apart by a predetermined spacing; each of the plurality of keys having a width in the peripheral direction which is smaller than said predetermined spacing;

the inner cone and the clutch hub being rotatable relative to each other through a predetermined angle in the peripheral direction;

whereby, during engagement of the hub sleeve with the gear spline, the synchronizer key pushes the outer cone into frictional engagement with the double cone which in turn comes into frictional engagement with the inner cone, thereby synchronizing the gear spline and the hub sleeve.

* * * * *